US012266780B2

(12) United States Patent
Nishiguchi et al.

(10) Patent No.: US 12,266,780 B2
(45) Date of Patent: Apr. 1, 2025

(54) METHOD FOR MANUFACTURING ELECTRODE FOR LITHIUM ION BATTERY

(71) Applicant: Nissan Motor Co., Ltd., Yokohama (JP)

(72) Inventors: Makoto Nishiguchi, Kyoto (JP); Hideki Ishitani, Kyoto (JP); Hideaki Horie, Kanagawa (JP); Kazuyuki Yoda, Kanagawa (JP); Hiroshi Kubota, Kanagawa (JP); Yuki Kusachi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 920 days.

(21) Appl. No.: 17/058,703

(22) PCT Filed: May 30, 2019

(86) PCT No.: PCT/JP2019/021610
§ 371 (c)(1),
(2) Date: Nov. 25, 2020

(87) PCT Pub. No.: WO2019/230912
PCT Pub. Date: Dec. 5, 2019

(65) Prior Publication Data
US 2021/0151739 A1  May 20, 2021

(30) Foreign Application Priority Data
May 30, 2018  (JP) .................. 2018-103937

(51) Int. Cl.
*H01M 4/04* (2006.01)
*H01M 10/0525* (2010.01)
*H01M 10/058* (2010.01)

(52) U.S. Cl.
CPC ..... *H01M 4/0435* (2013.01); *H01M 10/0525* (2013.01); *H01M 10/058* (2013.01)

(58) Field of Classification Search
CPC .. H01M 4/135; H01M 4/0404; H01M 4/0433; H01M 4/13; H01M 4/0435; H01M 4/0411; H01M 4/04; H01M 4/139–1399
See application file for complete search history.

(56) References Cited

U.S. PATENT DOCUMENTS 5,749,927 A * 5/1998 Chern .................. H01M 4/13
29/623.5
2003/0215710 A1* 11/2003 Lavoie ............... B32B 37/1054
264/105

(Continued)

FOREIGN PATENT DOCUMENTS

CN        105993088 A    10/2016
JP        11-7981 A      1/1999
(Continued)

*Primary Examiner* — Livius R. Cazan
(74) *Attorney, Agent, or Firm* — Global IP Counselors, LLP

(57) ABSTRACT

A manufacturing method is provided for manufacturing an electrode for a lithium-ion battery having a current collector and an electrode active material layer. In the method, an electrolytic solution is added to particles created by pulverizing a mixture containing electrode active material particles and a pressure sensitive adhesive resin to obtain an electrode active material composition. The electrode active material composition is molded into sheet form on a current collector using a roll press. The electrode active material composition has a weight of the electrolytic solution based on a total weight of the electrode active material composition that is 0.1-50 wt %.

10 Claims, 2 Drawing Sheets

(56) References Cited

U.S. PATENT DOCUMENTS

| | | | |
|---|---|---|---|
| 2006/0263688 A1* | 11/2006 | Guyomard | H01G 11/48 252/182.1 |
| 2017/0012283 A1 | 1/2017 | Mizuno et al. | |
| 2017/0033350 A1 | 2/2017 | Mizuno et al. | |
| 2017/0373343 A1* | 12/2017 | Mesuda | H01M 4/0435 |

FOREIGN PATENT DOCUMENTS

| | | |
|---|---|---|
| JP | H11-7981 A | 1/1999 |
| JP | 2010-171366 A | 8/2010 |
| JP | 4939927 B2 | 5/2012 |
| JP | 2012-150905 A | 8/2012 |
| JP | 2014-132564 A | 7/2014 |
| JP | 2017-54703 A | 3/2017 |
| WO | 2015/005117 A1 | 1/2015 |
| WO | 2020/196591 A1 | 10/2020 |

\* cited by examiner

METHOD FOR MANUFACTURING ELECTRODE FOR LITHIUM ION BATTERY

CROSS-REFERENCE TO RELATED APPLICATIONS

This application is a U.S. national stage application of International Application No. PCT/JP2019/021610, filed on May 30, 2019. The present application claims priority based on Japanese Patent Application No. 2018-103937 filed on May 30, 2018, and the entire contents is hereby incorporated herein by reference.

TECHNICAL FIELD

The present invention relates to a method for manufacturing an electrode for a lithium-ion battery.

BACKGROUND INFORMATION

There has been acute demand in recent years for carbon dioxide emissions to be reduced in order to protect the environment. In the field of vehicles, carbon dioxide emissions are expected to be reduced by the introduction of electric vehicles (EV) and hybrid electric vehicles (HEV), and there has been earnest development of secondary batteries for driving motors, which are key to the practical application of such vehicles. Lithium ion batteries (also referred to as lithium ion secondary batteries), with which high energy density and high output density can be achieved, have been drawing attention as secondary batteries.

In one example of a method for manufacturing such a lithium-ion battery, a positive-electrode active material layer molded on a positive-electrode current collector and a negative-electrode active material layer molded on a negative-electrode current collector are made to face each other with a separator interposed therebetween to obtain a stack, the stack is accommodated in an outer cladding, and an electrolytic solution is then injected.

For example, Japanese Laid-Open Patent Application No. 2010-171366 discloses, as a method of forming a positive-electrode active material layer and a negative-electrode active material layer, a method in which an electrode active material layer containing an electrode active material and a binding agent is molded via a dry method in which water and solvents are not used on a support surface.

However, the dry method disclosed in Japanese Laid-Open Patent Application No. 2010-171366 presents problems in that: it is difficult to reduce the thickness of the electrode active material layer and the strength of an electrode active material layer molded on a thin layer is insufficient, making handling difficult; and sufficient cycle durability cannot be achieved.

The present invention was contrived in view of the problems described above, it being an object of the present invention to provide means with which it is possible through a simple procedure to obtain, with an excellent yield rate, a thin-film electrode active material layer that is easily handled despite being a thin layer, and it is possible to create a lithium-ion battery having exceptional cycle durability.

The inventors arrived at the present invention as a result of earnest research intended to solve the problems described above.

Specifically, the present invention relates to a method for manufacturing a lithium-ion battery comprising the steps of: obtaining a positive electrode and a negative electrode by molding an electrode active material composition containing electrode active material particles and an electrolytic solution into sheet form on a current collector using a roll press; and manufacturing a lithium-ion battery using the positive electrode and the negative electrode, the weight of the electrolytic solution based on a total weight of the electrode active material composition being 0.1-50 wt %.

BRIEF DESCRIPTION OF THE DRAWINGS

Referring now to the attached drawings which form a part of this original disclosure.

DETAILED DESCRIPTION OF EMBODIMENTS

Figure 1:
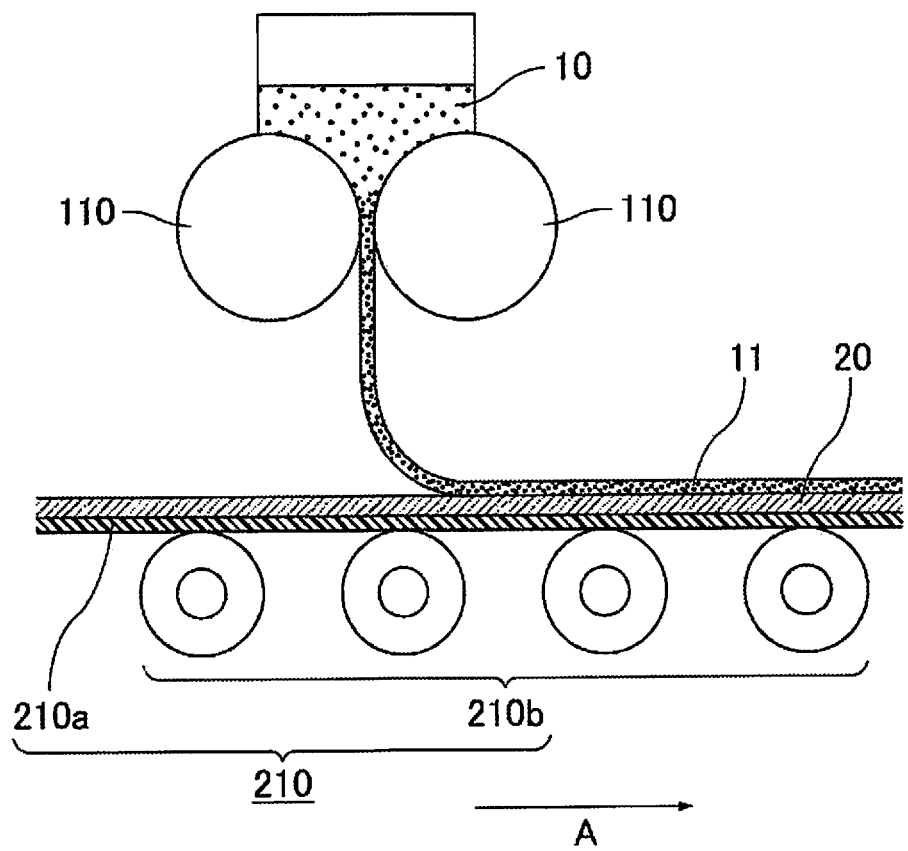
FIG. 1 is a schematic drawing of one example of a molding step when an electrode active material layer (electrode) is manufactured in the method for manufacturing a lithium-ion battery of the present invention.

The present invention is described in detail below. In this specification, use of the term "lithium-ion battery" is considered to encompass a lithium ion secondary battery as well.

The method for manufacturing a lithium-ion battery of the present invention is characterized by comprising the steps of: obtaining a positive electrode and a negative electrode by molding an electrode active material composition containing electrode active material particles and an electrolytic solution into sheet form on a current collector using a roll press; and manufacturing a lithium-ion battery using the positive electrode and the negative electrode, a weight of the electrolytic solution based on a total weight of the electrode active material composition being 0.1-50 wt %. According to the method for manufacturing a lithium-ion battery of the present invention, it is possible through a simple procedure to obtain, with an excellent yield rate, a thin-film electrode active material layer that is easily handled as a thin film, and it is possible to create a lithium-ion battery having exceptional cycle durability.

The "roll press" in the present invention is a machine comprising at least a pair of cylindrical pressure rolls disposed parallel with external peripheral surfaces facing each other, and a mechanism driving the rotation of the rolls, the above-described electrode active material composition, etc., being sandwiched and rolled into sheet form between the pair of rolls. The material quality and size of the rolls, the style of the rotation mechanism, the arrangement of the rolls and rotation mechanism, etc., are not particularly limited. Additionally, the direction in which the electrode active material layer is discharged from between the pair of rolls is not particularly limited; this direction may be horizontal or downward.

In the method for manufacturing a lithium-ion battery of the present invention, first, an electrode active material composition containing electrode active material particles and an electrolytic solution is molded into sheet form using a roll press. A positive electrode, in which a positive-electrode active material layer is disposed on the surface of a current collector, and a negative electrode, in which a negative-electrode active material layer is disposed on the surface of a current collector, are thereby both obtained. Using such a configuration makes it possible to obtain electrode active material layers of a positive electrode and a negative electrode through a simple operation of molding an electrode active material composition by using a roll press; therefore, molding mistakes do not occur readily and the yield rate is high.

Because the electrode active material composition already contains 0.1-50 wt % of an electrolytic solution, it is possible through a simple procedure to obtain an electrode active material layer in which the electrolytic solution has uniformly saturated through the interior.

Furthermore, even when there is excess electrolytic solution in the electrode active material composition, the excess electrolytic solution is separated from the electrode active material layer (molding) when the electrode active material layer is molded using the roll press, and the electrolytic solution content is therefore easily adjusted.

For the reasons described above, the method for manufacturing a lithium-ion battery of the present invention has a simple procedure and an excellent yield rate. As a result, a lithium-ion battery having exceptional cycle durability can be manufactured.

FIG. 1 is used to describe a manufacturing example of an electrode active material layer (electrode) in the method for manufacturing a lithium-ion battery of the present invention.

FIG. 1 is a schematic drawing of one example of a molding step when an electrode active material layer (electrode) is manufactured in the method for manufacturing a lithium-ion battery of the present invention.

In the molding step as shown in FIG. 1, an electrode active material composition 10 is compressed and molded into sheet form by rolls 110 of a roll press. The electrode active material composition 10 molded into sheet form becomes an electrode active material layer 11, which is discharged vertically and then layered on a surface of a base material 20.

When there is excess electrolytic solution in the electrode active material composition, the excess electrolytic solution is separated when the composition is compressed and molded into sheet form by the rolls 110, and it is therefore preferable to provide a mechanism that recovers the separated electrolytic solution.

The base material 20 may be moved in one direction in accordance with the speed at which the electrode active material composition 10 is molded. The means that moves the base material 20 in one direction is not particularly limited, but the base material 20 may be moved in one direction (the direction indicated by arrow A in FIG. 1) by a base material conveying means 210 composed of a placement section 210a and a drive unit 210b, as shown in FIG. 1. Additionally, when possessed of sufficient mechanical strength, the base material 20 may be moved in one direction by a method such as disposing the base material 20 directly on the drive unit 210b without providing a placement section 210a.

Figure 2:
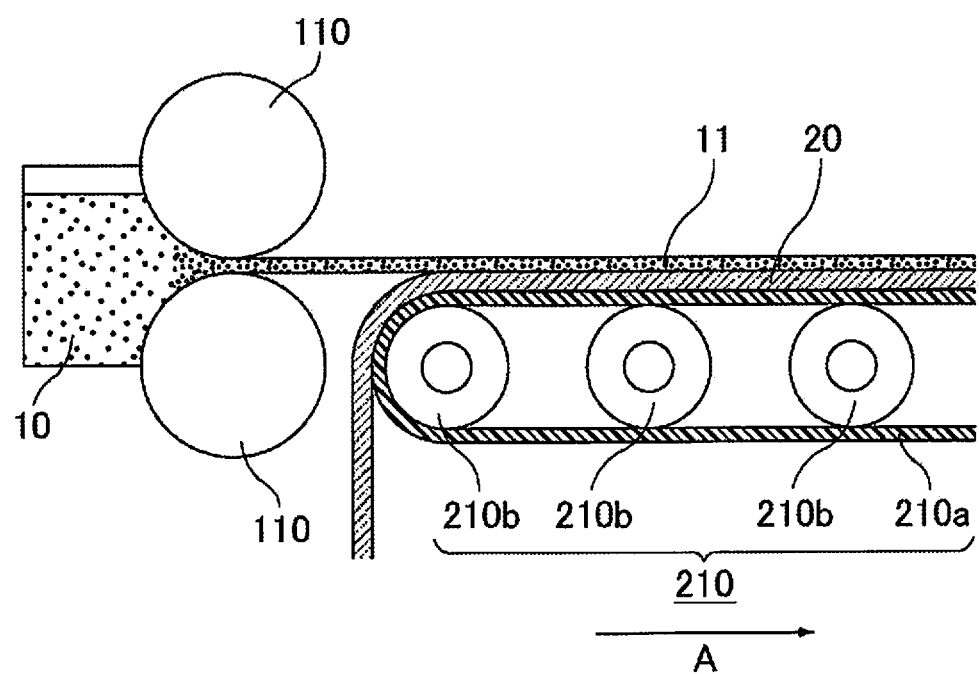
FIG. 2 is a schematic drawing of another example of a molding step when an electrode active material layer (electrode) is manufactured in the method for manufacturing a lithium-ion battery of the present invention.

In the molding step, the direction in which the electrode active material layer molded into sheet form is discharged is not particularly limited; the electrode active material layer 11 may be discharged horizontally as shown in FIG. 2.

FIG. 2 is a schematic drawing of another example of a molding step when an electrode active material layer (electrode) is manufactured in the method for manufacturing a lithium-ion battery of the present invention.

In the molding step as shown in FIG. 2, an electrode active material composition 10 is compressed and molded into sheet form by rolls 110 of a roll press. The electrode active material composition 10 molded into sheet form becomes an electrode active material layer 11, which is discharged horizontally and then layered on a surface of a base material 20.

In the method for manufacturing a lithium-ion battery of the present invention, the electrode active material composition, which is used to create both a positive electrode and a negative electrode, contains electrode active material particles and an electrolytic solution, and the weight of the electrolytic solution based on the total weight of the electrode active material composition is 0.1-50 wt %. This weight is preferably 1.5-50 wt %, more preferably 1.5-25 wt %, and even more preferably 1.8-20 wt %.

Due to the electrode active material composition having such a configuration, the surfaces of the electrode active material particles in the electrode active material layer after molding come to be wetted by the electrolytic solution, the electrolytic solution can easily saturate the electrode active material layer, and the electrode active material layer can uniformly contain the electrolytic solution.

When the electrode active material layer does not uniformly contain the electrolytic solution, voids in the electrode active material layer cause an electric resistance value to increase, and it is therefore preferable that the electrolytic solution be contained in the electrode active material layer after molding.

In the electrode active material layer obtained by molding the above-described electrode active material composition, the weight of the electrolytic solution, based on the total amount of voids in the electrode active material layer (weight (g) of electrolytic solution/total amount (mL) of voids in electrode active material layer), is preferably 0.01-0.5 g/mL. In this range, the uniformity of the electrolytic solution in the electrode active material layer is more favorable and cycle characteristics, etc., of the lithium-ion battery are more favorable.

The amount of voids in the electrode active material layer can be determined from the apparent volume of the electrode active material layer, and the sum of the products of the weights and true densities of the solid raw materials constituting the electrode active material layer.

In the method for manufacturing a lithium-ion battery of the present invention, a linear pressure the roll press exerts on the electrode active material composition when the positive electrode and the negative electrode are created is preferably 35-3500 N/cm.

The linear pressure the roll press exerts on the electrode active material composition is a linear pressure calculated from a load obtained through a load cell attached to the roll press and an electrode width after pressing.

A gap between the rolls of the roll press is not particularly limited, but is preferably 100-1000 μm from the standpoint of the linear pressure exerted on the electrode active material composition and the standpoint of adjusting a film thickness of the electrode active material layer.

A rotational speed of the rolls of the roll press is not particularly limited, but is preferably 1-20 m/min from the standpoint of preserving sufficient press-holding time.

The film thickness of the electrode active material layer constituting the positive electrode and negative electrode obtained via the method for manufacturing a lithium-ion battery of the present invention is not particularly limited, but is preferably 200-500 μm.

The electrode active material particles and electrolytic solution constituting the electrode active material composition shall next be described.

The electrode active material particles may be positive-electrode active material particles or negative-electrode active material particles.

The electrode active material composition may contain an electroconductive auxiliary agent, as necessary.

Examples of the positive-electrode active material particles include composite oxides of lithium and a transition metal (composite oxides in which there is one transition metal ($LiCoO_2$, $LiNiO_2$, $LiAlMnO_4$, $LiMnO_2$, $LiMn_2O_4$, etc.), composite oxides in which there are two transition metals (e.g., $LiFeMnO_4$, $LiNi_{1-x}Co_xO_2$, $LiMn_{1-y}Co_yO_2$, $LiNi_{1/3}Co_{1/3}Al_{1/3}O_2$, and $LiNi_{0.8}Co_{0.15}Al_{0.05}O_2$), and composite oxides in which there are three or more transition metals (e.g., $LiM_aM'_bM''_cO_2$ (M, M', and M'' are different transition metals, and a, b, and c add up to 1, e.g., $LiNi_{1/3}Mn_{1/3}Co_{1/3}O_2$) etc.), lithium-containing transition metal phosphates (e.g., $LiFePO_4$, $LiCoPO_4$, $LiMnPO_4$, and $LiNiPO_4$), transition metal oxides (e.g., $MnO_2$ and $V_2O_5$), transition metal sulfides (e.g., $MoS_2$ and $TiS_2$), and electroconductive polymers (e.g., polyaniline, polypyrrole, polythiophene, polyacetylene, poly-p-phenylene, and polyvinyl carbazole. Two or more of these examples may be used together.

A lithium-containing transition metal phosphate may have part of the transition metal site replaced with another transition metal.

The volume-average particle diameter of the positive-electrode active material particles is preferably 0.01-100 μm, more preferably 0.1-35 μm, and even more preferably 2-30 μm, from the standpoint of electric characteristics of the battery.

Examples of the negative-electrode active material particles include carbon-based materials (graphite, graphitized carbon, amorphous carbon, resin sintered products (e.g., products such as are obtained by sintering and carbonizing phenolic resins, furan resins, etc.) coke (e.g., pitch coke, needle coke, petroleum coke, etc.), carbon fibers, etc.), silicon-based materials (silicon, silicon oxide (SiOx), silicon-carbon complexes (complexes in which the surfaces of carbon particles are covered by silicon and/or silicon carbide, complexes in which the surfaces of silicon particles or silicon oxide particles are covered by carbon and/or silicon carbide, and silicon carbide, etc.), silicon alloys (silicon-aluminum alloys, silicon-lithium alloys, silicon-nickel alloys, silicon-iron alloys, silicon-titanium alloys, silicon-manganese alloys, silicon-copper alloys, silicon-tin alloys, etc.), etc.), electroconductive polymers (e.g., polyacetylene, polypyrrole, etc.), metals (tin, aluminum, zirconium, titanium, etc.), metal oxides (titanium oxides, lithium/titanium oxides, etc.), metal alloys (e.g., lithium-tin alloys, lithium-aluminum alloys, lithium-aluminum-manganese alloys, etc.), etc., and mixtures of carbon-based materials with these other materials.

Of the negative-electrode active material particles described above, those that do not internally contain lithium or lithium ions are subjected to a pre-doping treatment in advance, which causes some or all of the negative-electrode active material particles to contain lithium or lithium ions.

Among these examples, from the standpoint of battery capacity, etc., carbon-based materials, silicon-based materials, and mixtures thereof are preferred, graphite graphitized carbon, and amorphous carbon are more preferred as carbon-based materials, and silicon oxide and silicon-carbon complexes are more preferred as silicon-based materials.

The volume-average particle diameter of the negative-electrode active material particles is preferably 0.01-100 μm, more preferably 0.1-20 μm, and even more preferably 2-10 μm, from the standpoint of electric characteristics of the battery.

In this specification, the volume-average particle diameter of electrode active material particles refers to the particle diameter (Dv50) at a cumulative 50% point in a particle size distribution determined by a Microtrac method (laser diffraction-scattering). A Microtrac method is a method of determining particle size distribution using scattered light obtained by irradiating particles with laser light. An apparatus such as a Microtrac (Nikkiso) can be used to measure the volume-average particle diameter.

The electroconductive auxiliary agent is selected from materials having electroconductivity.

Specifically, examples include metals (nickel, aluminum, stainless steel (SUS), silver, copper, titanium, etc.), carbon (graphite, carbon black (acetylene black, Ketjen Black®, furnace black, channel black, thermal lamp black, etc.), etc.), and mixtures thereof, but these are not provided by way of limitation.

These electroconductive auxiliary agents may be used alone, or two or more may be used together. Additionally, alloys or metal oxides of these agents may be used. From the standpoint of electrical stability, aluminum, stainless steel, carbon, silver, steel, titanium, and mixtures thereof are preferred, silver, aluminum, stainless steel, and carbon being more preferred, and carbon being even more preferred. These electroconductive auxiliary agents may also be coated by plating, etc., with an electroconductive material (the metals of the above-described electroconductive auxiliary agents) around a particle-based ceramic material or a resin material.

The average particle diameter of the electroconductive auxiliary agent is not particularly limited, but is preferably 0.01-10 μm, more preferably 0.02-5 μm, and even more preferably 0.03-1 μm, from the standpoint of the electric characteristics of the battery, specification, "particle diameter" refers to the greatest distance L from among distances between any two points on the contour of the electroconductive auxiliary agent. A value calculated as the average value of the particle diameters of particles observed in several or several tens of fields of view using a scanning electron microscope (SEM), a transmission electron microscope (TEM), or another observation means is employed as the value of the "average particle diameter."

The shape (form) of the electroconductive auxiliary agent is not particularly limited; the agent may have a form other than particulate, or the agent may be carbon nanotubes or another form put into practical use as a "filler-based electroconductive resin composition."

The electroconductive auxiliary agent can be an electroconductive fiber, of which the shape is fibrous. Examples of electroconductive fibers include: PAN-based carbon fiber, pitch-based carbon fiber, and other carbon fiber; electroconductive fiber obtained by uniformly dispersing a highly electroconductive metal or graphite in synthetic fiber; metal fiber in which a metal such as stainless steel is formed into fiber; electroconductive fiber in which the surface of organic fiber is coated with a metal; and electroconductive fiber in which the surface of organic fiber is coated with a resin that contains an electroconductive substance. Among these electroconductive fibers, carbon fiber is preferred. Additionally, a polypropylene resin in which graphene is kneaded is also preferred.

When the electroconductive auxiliary agent is electroconductive fiber, an average fiber diameter thereof is preferably 0.1-20 μm.

Coated electrode active material particles, which are electrode active material particles partially covered on the surface by a coating resin that can absorb and cause swelling of the electrolytic solution, may be used as the electrode active material particles.

The coating resin can exhibit lithium ion electroconductivity by absorbing the electrolytic solution, and can reduce a value of resistance between the electrode active material particles. Furthermore, when the peripheries of the electrode active material particles are coated by a coating resin, volume changes in the electrode can be mitigated and electrode expansion can be minimized.

Coated electrode active material particles in the case of using positive-electrode active material particles as the electrode active material particles are referred to as coated positive-electrode active material particles, and the electrode active material layer is referred to as a coated positive-electrode active material layer. Coated electrode active material particles in the case of using negative-electrode active material particles as the electrode active material particles are referred to as coated negative-electrode active material particles, and the electrode active material layer is referred to as a coated negative-electrode active material layer.

Resins that can be used as the coating resin include, inter alia, the resin for coating a lithium-ion battery active material disclosed in International Laid-Open Patent Application No. 2015/005117 and Japanese Laid-Open Patent Application No. 2017-054703.

The ratio of the coating resin to the coated electrode active material particles is preferably 1-20 wt %, and from the standpoint of moldability and the resistance value is more preferably 2-7 wt %.

When the coated electrode active material particles are included, a swelling rate of the coating resin upon immersion in the electrolytic solution is preferably 5-50%.

The swelling rate during immersion in the electrolytic solution is determined through the following formula, by measuring the weight of the coating resin before and after immersion in the electrolytic solution.

Swelling rate (%)=[(weight of polymer compound after electrolytic solution immersion−weight of polymer compound before electrolytic solution immersion)/weight of polymer compound before electrolytic solution immersion]×100

The electrolytic solution used for determining the swelling rate is preferably an electrolytic solution in which $LiPF_6$ is dissolved to a concentration of 1 mol/L as an electrolyte in an ethylene carbonate (EC)/diethylene carbonate (DEC) solvent mixture that has been mixed at a volume ratio of EC:DEC=3:7.

The immersion in the electrolytic solution when determining the swelling rate is done for three days at 50° C. By being immersed for three days at 50° C., the coating resin becomes saturated with absorbed liquid. "Saturated with absorbed liquid" refers to a state in which the weight of the coating resin does not increase even if the resin is immersed in the electrolytic solution any longer.

The electrolytic solution used to manufacture the electrode active material layer is not limited to the electrolytic solution described above; other electrolytic solutions may be used.

When the swelling rate is 5% or greater, lithium ions can easily permeate the polymer compound, and a diffusion resistance of the lithium ions in the electrode active material layer can therefore be kept low.

The electrode active material composition used in the manufacturing method of the present invention preferably has pressure sensitive adhesion from the standpoint of obtaining a thin electrode active material layer.

The term "pressure sensitive adhesion" here refers to the definition found in JIS Z0109:2015, Glossary of terms used in pressure sensitive adhesive tapes and sheets, which is "An action observed in highly viscous liquids; the action of bonding to an adherend with merely the application of slight pressure." The term "pressure sensitive adhesiveness" refers to the property of being able to bond to an adherend with merely the application of slight pressure. The phrase "the electrode active material composition has pressure sensitive adhesiveness" refers to a state in which due to the application of slight pressure to the electrode active material composition, some or all of the electrode active material particles and/or coated electrode active material particles included in the electrode active material composition become an integrated whole by bonding in the form of an aggregated mass, and can be separated with little force.

When electrode active material particles not coated by a coating resin are used and when the above-described coated electrode active material particles are used, a method of mixing a pressure sensitive adhesive resin with the electrode active material composition to impart pressure sensitive adhesiveness to the electrode active material composition can be used. Additionally, when the above-described coated electrode active material particles are used, the method of imparting pressure sensitive adhesiveness to the electrode active material composition can be one in which an organic solvent capable of dissolving the coating resin is added to the electrode active material composition and some of the coating resin on the surfaces of the electrode active material particles is dissolved.

Preferred among these methods is one in which a pressure sensitive adhesive resin is mixed with the electrode active material composition to impart pressure sensitive adhesiveness to the electrode active material composition.

Specifically, the electrode active material composition used to create positive electrode and the negative electrode in the method for manufacturing a lithium-ion battery of the present invention preferably also contains a pressure sensitive adhesive resin.

A pressure sensitive adhesive resin is one capable of reversibly bonding to an adherend in a short time and with slight pressure at room temperatures, and this resin preferably includes, as an essential structural monomeric substance, at least one low-Tg monomer selected from the group consisting of vinyl acetate, 2-ethylhexyl acrylate, 2-ethylhexyl methacrylate, butyl acrylate, and butyl methacrylate. The total weight ratio of the low-Tg monomer is preferably 45 wt % or more, on the basis of the total weight of structural monomeric substances.

The coating resin and the pressure sensitive adhesive resin are differentiated in that the coating resin does not exhibit pressure sensitive adhesiveness if a solvent that dissolves part of the coating resin is not used therein, whereas the pressure sensitive adhesive resin exhibits pressure sensitive adhesiveness in the electrode active material composition without the use of a solvent that dissolves part of the pressure sensitive adhesive resin.

The pressure sensitive adhesive resin may be a polymeric substance containing 2-hydroxyethyl methacrylate, an acrylic acid, etc., in addition to the essential structural monomeric substance.

When a pressure sensitive adhesive resin is used in the electrode active material composition, the pressure sensitive adhesive resin is preferably used in an amount of 0.1-6 wt % in relation to the total weight of the electrode active material particles.

A known electrolytic solution that is used to manufacture lithium ion batteries and that contains an electrolyte and a non-aqueous solvent can be used as the electrolytic solution.

The electrolyte can be, inter alia, one that is used in known electrolytic solutions; possible examples of the electrolyte include: $LiPF_6$, $LiBF_4$, $LiSbF_6$, $LiAsF_6$, $LiClO_4$, $LiN(SO_2F)_2$, and other lithium salts of inorganic anions; $LiN(SO_2CF_3)_2$, $LiN(SO_2C_2F_5)_2$, $LiC(SO_2CF_3)_3$, and other lithium salts of organic anions; etc. Preferred among these from the standpoint of battery output and charging/discharging cycle characteristics are $LiN(SO_2)F_2$ and $LiPF_6$.

The non-aqueous solvent can be, inter alia, one that is used in known electrolytic solutions; possible examples of the non-aqueous solvent include lactone compounds, cyclic or chain carbonates, chain carboxylates, cyclic or chain ethers, phosphate esters, nitrile compounds, amide compounds, sulfones, sulfolanes, etc., and mixtures thereof.

Possible examples of lactone compounds include five-membered ring lactone compounds (γ-butyrolactone, γ-valerolactone, etc.) and six-membered ring lactone compounds (δ-valerolactone, etc.).

Possible examples of cyclic carbonates include propylene carbonate, ethylene carbonate, and butylene carbonate.

Possible examples of chain carbonates include dimethyl carbonate, methylethyl carbonate, diethyl carbonate, methyl-n-propyl carbonate, ethyl-n-propyl carbonate, and di-n-propyl carbonate.

Possible examples of chain carboxylates include methyl acetate, ethyl acetate, propyl acetate, and methyl propionate.

Possible examples of cyclic ethers include tetrahydrofuran, tetrahydropyran, 1,3-dioxolane, and 1,4-dioxane.

Possible examples of chain ethers include dimethoxymethane and 1,2-dimethoxyethane.

Possible examples of phosphate esters include trimethyl phosphate, triethyl phosphate, ethyldimethyl phosphate, diethylmethyl phosphate, tripropyl phosphate, tributyl phosphate, tri(trifluoromethyl) phosphate, tri(trichloromethyl) phosphate, tri(trifluoroethyl) phosphate, tri(triperfluoroethyl) phosphate, 2-ethoxy-1,3,2-dioxaphospholane-2-one, 2-trifluoroethoxy-1,3,2-dioxaphospholane-2-one, and 2-methoxyethoxy-1,3,2-dioxaphospholane-2-one.

Possible examples of nitrile compounds include acetonitrile. Possible examples of amide compounds include DMF. Possible examples of sulfones include dimethyl sulfone and diethyl sulfone.

One non-aqueous solvent may be used alone, or two or more non-aqueous solvents may be used together.

Preferred among non-aqueous solvents, from the standpoints of battery output and charging/discharging cycle characteristics, are lactone compounds, cyclic carbonates, chain carbonates, and phosphate esters. Lactone compounds, cyclic carbonates, and chain carbonates are more preferred, and a liquid mixture of cyclic carbonates and chain carbonates is particularly preferred. The most preferred is a liquid mixture of ethylene carbonate (EC) and dimethyl carbonate (DMC), or a liquid mixture of ethylene carbonate (EC) and diethyl carbonate (DEC).

A description shall be given of the method for manufacturing the coated active material particles described above.

The coated active material particles may be manufactured by, for example mixing a coating resin, electrode active material particles, and an electroconductive agent to be used as needed. When an electroconductive agent is used in the coating layers, the coating resin and the electroconductive agent are mixed together to prepare a coating material, after which the coated active material particles may be manufactured by mixing the coating material and the electrode active material particles. The coated active material particles may also be manufactured by mixing a coating resin, an electroconductive agent, and electrode active material particles.

When the electrode active material particles, a coating resin, and an electroconductive agent are mixed, there are no particular limitations on the mixing order, but it is preferable to mix the electrode active material particles and the coating resin together and then add the electroconductive agent to the mixture. According to the above-described method, at least parts of the surfaces of the electrode active material are coated by a coating layer containing a coating resin and an electroconductive agent to be used as needed.

For the electroconductive agent, which is an arbitrary component of the coating material, something similar to the electroconductive auxiliary agent constituting the electrode active material composition can be suitably used.

There are no limitations on the electrode active material composition used to create the positive electrode and the negative electrode in the method for manufacturing a lithium-ion battery of the present invention, provided that the composition contains electrode active material particles and an electrolytic solution. The electrode binder content (also referred to simply as a binding agent or a binder) in the electrode active material composition is preferably low, e.g., 1 wt % or less, more preferably 0.5 wt % or less, even more preferably 0.1 wt % or less, and particularly preferably 0 wt % (i.e., the composition does not contain an electrode binder).

In this specification, "electrode binder" refers to a known solvent-drying binding agent for a lithium-ion battery (starch, polyvinylidene fluoride, polyvinyl alcohol, carboxymethyl cellulose, polyvinyl pyrrolidone, tetrafluoroethylene, styrene-butadiene rubber, polyethylene, polypropylene, a styrene-butadiene copolymer, or another material, this material being used after being dissolved or dispersed in a solvent, and this material binding with other materials by volatilizing and distilling the solvent and causing the solvent to precipitate as a solid) used in order to bindably secure electrode active materials to each other and also secure an electrode active material and a current collector together. When these electrode binders have dried by volatilizing the solvent component, the binders solidify without exhibiting pressure sensitive adhesiveness on the surface, and the binders firmly secure electrode active materials to each other as well as firmly securing an electrode active material and a current collector together.

"Pressure sensitive adhesive resin" refers to a resin that exhibits pressure sensitive adhesiveness without solidifying even when having volatilized and dried the solvent component; therefore, such resins are distinct in being materials that differ from electrode binders and bonding resins, which solidify into substances that cannot bond to an adherend merely with the application of slight pressure.

When the electrode active material composition contains an electrode binder, drying must be performed to perform binding via the electrode binder at a timing either before the composition is molded into sheet form or after the composition is molding into sheet form. With an electrode binder with which drying is performed before the composition is molded into sheet form, cracks and other defects due to pressure occur readily because the composition is compressed in a state of having been hardened by the binder.

When the composition is dried after being molded into sheet form, cracking and other defects occur readily due to, inter alia, constriction caused by the drying. The electrode active material composition used in the method for manufacturing a lithium-ion battery of the present invention preferably does not contain an electrode binder because there will be no incidence of cracking or other defects due to compression.

In the method for manufacturing a lithium-ion battery of the present invention, the electrode active material layer obtained via roll pressing may be layered over a base material or a base material need not be provided. When a base material is not provided and when the electrode active material layer is layered over a base material and the base material is not a current collector, electrodes (positive electrode and negative electrode) for a lithium-ion battery are obtained by combining the electrode active material layer and the current collector. When the electrode active material layer is layered over a base material and the base material is a current collector, this assembly will become electrodes (positive electrode and negative electrode) for a lithium-ion battery and will not need to be combined with a separate current collector.

According to another embodiment of the present invention, there is provided a method for manufacturing an electrode for lithium-ion battery having a current collector and an electrode active material layer, the manufacturing method characterized by comprising a molding step of molding an electrode active material composition containing electrode active material particles and an electrolytic solution into sheet form on the current collector using a roll press, the weight of the electrolytic solution based on the total weight of the electrode active material composition being 1-50 wt %.

In the method for manufacturing a lithium-ion battery of the present invention, the material constituting the base material for holding the electrode active material layer is not particularly limited, but is desirably a material that functions as a positive-electrode current collector, a negative-electrode current collector, or another current collector, or a material which does not function as a current collector and allows the electrode active material layer to be easily separated from the surface thereof.

Possible examples of the current collector include: current-collecting foils made of steel, aluminum, carbon-coating aluminum, titanium, stainless steel, nickel, and other metals; resin current collectors composed of electroconductive polymers (disclosed in Japanese Laid-Open Patent Application No. 2012-150905, etc.); electroconductive carbon sheets; electroconductive glass sheets; etc.

Resin films, fluororesins, etc., in which a release treatment or another non-adhesive treatment has been performed on the surface, are preferred examples of a base material which is composed of a material that does not function as a current collector and from the surface of which the electrode active material layer is easily separated.

In the method for manufacturing a lithium-ion battery of the present invention, the film thickness of the base material is not particularly limited, but when the base material is a current collector, the film thickness is preferably 90-110 μm.

In the method for manufacturing a lithium-ion battery of the present invention, the movement speed of the base material is not particularly limited, but is preferably adjusted to a speed such that the electrode active material layer discharged from the roll press does not remain and can move so as to not be subjected to extra stress.

An example of the method for manufacturing a lithium-ion battery of the present invention is a method of obtaining a lithium-ion battery by, inter alia, disposing a positive electrode and a negative electrode obtained via the steps described above with a separator interposed therebetween, and accommodating the electrodes in a battery outer cladding as necessary.

In the method for manufacturing a lithium-ion battery of the present invention, known materials can be used as the materials of the separator, etc.

EXAMPLES

The present invention shall next be described in detail through examples, but the present invention shall not be limited to the examples provided that there is no deviation from the scope of the present invention. The term "parts" refers to parts by weight and the percentage symbol refers to percentage by weight unless otherwise noted.

Manufacturing Example 1: Manufacture of Pressure Sensitive Adhesive Resin 5.0 parts of vinyl acetate, 23.7 parts of 2-ethylhexyl acrylate, and 185.5 parts of ethyl acetate were charged into a four-neck flask fitted with a stirrer, a temperature gauge, a reflux cooling pipe, a dropping funnel, and a nitrogen gas introduction pipe, and the temperature was raised to 75° C. 11.1 parts of vinyl acetate, 21.0 parts of 2-ethylhexyl acrylate, 28.1 parts of 2-hydroxyethyl methacrylate, 11.1 parts of acrylic acid, 0.200 parts of 2,2'-azobis(2,4-dimethylvaleronitrile), and 0.200 parts of 2,2'-azobis(2-methylbutryonitrile) were mixed together to obtain a monomeric liquid mixture. The obtained monomeric liquid mixture was continuously added dropwise into the four-neck flask over the course of four hours using the dropping funnel while nitrogen was blown into the four-neck flask, and radical polymerization was carried out. After dropwise addition was complete, a solution in which 0.800 parts of 2,2'-azobis(2,4-dimethylvaleronitrile) was dissolved in 12.4 parts of ethyl acetate was continuously added over the course of six to eight hours after the start of polymerization using the dropping funnel. Polymerization was furthermore continued for two hours at a boiling point, and 702.4 parts of ethyl acetate was added to obtain a pressure sensitive adhesive resin solution having a resin concentration of 10 wt %. The solution was then kept in a 100° C. vacuum dryer for three hours, whereby the ethyl acetate was removed. The weight-average molecular weight (abbreviated as $M_w$ below) of the pressure sensitive adhesive resin was 420,000.

$M_w$ was determined by gel permeation chromatography under the following conditions.

Device: "HLC-8120GPC" (Tosoichi)

Column: "TSKgel GMHXL" (two), "TSKgel Multipore HXL-M, one connected to each" (both Tosoichi)

Sample solution: 0.25 wt % tetrahydrofuran solution

Amount of solution added: 10 μL

Flow rate: 0.6 mL/min

Measured temperature: 40° C.

Detection device: Refractive index detector

Standard substance: standard polystyrene (Tosoichi)

Manufacturing Example 2: Preparation of Electrolytic Solution $LiN(FSO_2)_2$ (LiFSI) was dissolved at a ratio of 2 mol/L in an ethylene carbonate (EC)/propylene carbonate (PC) solvent mixture (volume ratio: 1:1) to prepare an electrolytic solution for a lithium-ion battery.

Example 1

Molding of Positive-Electrode Active Material Layer

Using an all-purpose, high-speed mixer FS25 (EarthTechnica), 20 parts of carbon fiber (Donacarbo Milled S-243 (Osaka Gas Chem)), 300 parts of the pressure sensitive adhesive resin solution obtained in manufacturing example 1, 57 parts of acetylene black (Denka Black (Denka)), and 875 parts of $LiNi_{0.8}Co_{0.15}Al_{0.05}O_2$ (HED NCA-7050 (BASF Toda Battery Materials), having a volume-average particle diameter of 10 μm) were stirred for fifteen minutes at room temperature and at 720 rpm. Pressure was reduced to 0.01 MPa while stirring was maintained, temperature was raised to 80° C. while stirring and reduced pressure were maintained, and then stirring, reduced pressure, and temperature were maintained for eight hours to distill off volatile components. The obtained mixture was pulverized to create particles in a Hammer Crusher NH-34S (Sansho Industry) fitted with a 300 μm metal mesh, and positive-electrode active material particles were obtained. In the obtained positive-electrode active material particles, the weight ratio of the pressure sensitive adhesive resin relative to the total weight of the positive-electrode active material particles was 3.06 wt %. 98.2 parts of the obtained positive-electrode active material particles and 1.8 parts of the electrolytic solution created in manufacturing example 2 were charged into a planetary-stirring-type mixing kneader (Awatori Rentaro "Thinky") and mixed for five minutes at 2000 rpm to create a positive-electrode active material composition in which the weight ratio of the electrolytic solution based on the total weight of the electrode active material composition was 1.8 wt %. When the obtained positive-electrode active material composition was pressed with a finger, some of the positive-electrode active material particles contained in the positive-electrode active material composition became an integrated whole by bonding in the form of an aggregated mass, and were able to be separated with little force.

The obtained positive-electrode active material composition was charged into a powder-charging port set into the roll press, and the positive-electrode active material composition was molded under the following conditions.

The positive-electrode active material layer discharged from the roll press firmly held together in the sense that the form was not compromised even if the layer was placed on a glass plate and moved, and the layer had a uniform thickness of 350 μm and a smooth surface. The weight of the electrolytic solution, which was based on the amount of voids in the positive-electrode active material layer as determined from the apparent volume of the positive-electrode active material layer and the sum of the products of the weights and true densities of the solid raw materials constituting the positive-electrode active material layer, was 0.26 g/mL.

The thickness of the positive-electrode active material layer was measured by micrometer.

Roll Press Conditions
 Roll size: 250 mmφ×400 mm
 Roll rotation speed: 1 m/min
 Gap between rolls: 350 μm
 Pressure: 10 kN (line pressure: 25 kN/m)

Molding of Negative-Electrode Active Material Layer

Using an all-purpose, high-speed mixer FS25 (EarthTechnica), 20 parts of carbon fiber (Donacarbo Milled S-243 (Osaka Gas Chem)), 300 parts of the pressure sensitive adhesive resin solution obtained in manufacturing example 1, 57 parts of acetylene black (Denka Black (Denka)), and 430 parts of negative-electrode material carbon for a lithium-ion battery (CARBOTRON P (Kureha Battery Materials Japan), particle diameter: 20 μm) were stirred for fifteen minutes at room temperature and at 720 rpm. Pressure was reduced to 0.01 MPa while stirring was maintained, temperature was raised to 80° C. while stirring and reduced pressure were maintained, and then stirring, reduced pressure, and temperature were maintained for eight hours to distill off volatile components. The obtained mixture was pulverized to create particles in a Hammer Crusher NH-34S (Sansho Industry) fitted with a 300 μm metal mesh, and negative-electrode active material particles were obtained. In the obtained negative-electrode active material particles, the weight ratio of the pressure sensitive adhesive resin relative to the total weight of the negative-electrode active material particles was 5.59 wt %. 98.2 parts of the obtained negative-electrode active material particles and 1.8 parts of the electrolytic solution created in manufacturing example 2 were charged into a planetary-stirring-type mixing kneader (Awatori Rentaro "Thinky") and mixed for five minutes at 2000 rpm to create a negative-electrode active material composition in which the weight ratio of the electrolytic solution based on the total weight of the negative-electrode active material composition was 1.8 wt %.

When the obtained negative-electrode active material composition was pressed with a finger, some of the electrode active material particles contained in the negative-electrode active material composition became an integrated whole by bonding in the form of an aggregated mass, and were able to be separated with little force.

The obtained negative-electrode active material composition was molded in a roll press in the same manner as in "Molding of positive-electrode active material layer" described above, and the negative-electrode active material composition was molded. The negative-electrode active material layer discharged from the roll press firmly held together in the sense that the form was not compromised even if the layer was placed on a glass plate and moved, and the layer had a uniform thickness of 350 μm and a smooth surface. The weight of the electrolytic solution, which was based on the amount of voids in the negative-electrode active material layer determined from the apparent volume of the negative-electrode active material layer and the sum of the products of the weights and true densities of the solid raw materials constituting the negative-electrode active material layer, was 0.21 g/mL.

Creation of Lithium-Ion Battery

The positive-electrode active material layer (size: 18 cm×9 cm×350 μm) obtained as described above was placed on carbon-coated aluminum foil fitted with a terminal for current extraction, a separator (Celguard 3501, thickness 25 μm) was placed on the positive-electrode active material layer, the negative-electrode active material layer (size: 18.2 cm×9.2 cm×350 μm) obtained as described above was placed on the separator, copper foil fitted with a terminal for current extraction was placed on the negative-electrode active material layer, the terminals for current extraction on the positive-electrode size and negative-electrode side were oriented to protrude in the same direction and sandwiched between two commercial heat-welding aluminum laminated films (25 cm×13.2 cm), and the protruding edge of each terminal was heat-welded. During these placements, the positive-electrode active material layer and the negative-electrode active material layer could be handled without breaking, cracking, etc., due to gravity.

The laminate cell was then closed so that the aluminum foil in the laminate cell was covered, and two edges orthogonal to the prior heat-welded edge were heat-sealed.

5 parts of the electrolytic solution created in manufacturing example 2 was poured in from the remaining edge and the remaining edge was heat-sealed while a vacuum was created in the cell interior using a vacuum sealer, whereby the laminate cell was sealed and a lithium-ion battery was created.

The created battery was set in a charging/discharging measurement device "HJ0501SM" (Hokuto Denko), and the battery was first charged with a 0.05 C current to 4.2 V by using a constant current, constant voltage charging process at 45° C., and charging was ceased for ten minutes. Electric discharging of the battery was then performed with a 0.05 C current to 2.5 V, and discharging was ceased for 10 minutes (initial charging and discharging). Charging at 0.05 C to 4.2 V and discharging at 0.05 C to 2.5 V were repeated with ten minute cessation times therebetween, ten cycles of charging and discharging were performed apart from the initial charging and discharging, the capacity during the first-cycle discharging and the capacity at the tenth-cycle discharging were measured, and a tenth-cycle capacity maintenance ratio was evaluated from these ratios.

As a result, the tenth-cycle capacity maintenance ratio of the lithium-ion battery created in example 1 was 97%, and the battery functioned without problems.

The tenth-cycle capacity maintenance ratio was calculated according to the computation formula below.

tenth-cycle capacity maintenance ratio (%)=[(tenth-cycle discharging capacity of battery for evaluation)/(first-cycle discharging capacity of battery for evaluation)×100]

Example 2

Molding of Positive-Electrode Active Material Layer

A positive-electrode active material composition, in which the weight ratio of the electrolytic solution based on the total weight of the electrode active material composition was 50 wt %, was created in the same manner as in example 1, except that the amount positive-electrode active material particles was changed to 50 parts and the amount electrolytic solution created in manufacturing example 2 was changed to 50 parts.

When the obtained positive-electrode active material composition was pressed with a finger, some of the positive-electrode active material particles contained in the positive-electrode active material composition became an integrated whole by bonding in the form of an aggregated mass, and were able to be separated with little force. The obtained positive-electrode active material composition was charged into a powder-charging port set into the roll press, and the positive-electrode active material composition was molded under the same conditions as in example 1.

The positive-electrode active material composition was discharged from the roll press while excess electrolytic solution was separated, the discharged positive-electrode active material layer firmly held together in the sense that the form was not compromised even if the layer was placed on a glass plate and moved, and the layer had a uniform thickness of 350 μm and a smooth surface. The weight of the electrolytic solution, which was based on the total amount of voids in the positive-electrode active material layer determined from the apparent volume of the positive-electrode active material layer and the sum of the products of the weights and true densities of the solid raw materials constituting the positive-electrode active material layer, was 0.47 g/mL.

Molding of Negative-Electrode Active Material Layer

A negative-electrode active material composition, in which the weight ratio of the electrolytic solution based on the total weight of the electrode active material composition was 50 wt %, was created in the same manner as in example 1, except that the negative-electrode active material particles were changed to 50 parts and the amount electrolytic solution created in manufacturing example 2 was changed to 50 parts.

When the obtained negative-electrode active material composition was pressed with a finger, some of the negative-electrode active material particles contained in the negative-electrode active material composition became an integrated whole by bonding in the form of an aggregated mass, and were able to be separated with little force. The obtained negative-electrode active material composition was molded in a roll press in the same manner as example 1, and a negative-electrode active material composition was molded.

The negative-electrode active material composition was discharged from the roll press while excess electrolytic solution was separated, the discharged negative-electrode active material layer firmly held together in the sense that the form was not compromised even if the layer was placed on a glass plate and moved, and the layer had a uniform thickness of 350 μm and a smooth surface. The weight of the electrolytic solution, which was based on the total amount of voids in the negative-electrode active material layer determined from the apparent volume of the negative-electrode active material layer and the sum of the products of the weights and true densities of the solid raw materials constituting the negative-electrode active material layer, was 0.45 g/mL.

Creation of Lithium-Ion Battery]

Copper foil, a positive-electrode active material layer, a separator, a negative-electrode active material layer, and carbon-coated aluminum foil were layered in the same manner as in example 1, 2 parts of the electrolytic solution was poured in, the layered components were then sealed to an aluminum laminate film, and a lithium-ion battery was created. Even during the layering, the positive-electrode active material layer and the negative-electrode active material layer could be handled without breaking, cracking, etc., due to gravity.

Charging/Discharging Test

As a result of conducting a charging/discharging test in the same manner as example 1, the tenth-cycle capacity maintenance ratio was 94%, and the battery functioned without problems.

Example 3

Molding of Positive-Electrode Active Material Layer

A positive-electrode active material composition, in which the weight ratio of the electrolytic solution based on the total weight of the electrode active material composition was 20 wt %, was created in the same manner as in example 1, except that the amount positive-electrode active material particles was changed to 80 parts and the amount electrolytic solution created in manufacturing example 2 was changed to 20 parts.

When the obtained positive-electrode active material composition was pressed with a finger, some of the positive-electrode active material particles contained in the positive-electrode active material composition became an integrated whole by bonding in the form of an aggregated mass, and were able to be separated with little force. The obtained positive-electrode active material composition was charged into a powder-charging port set into the roll press, and the positive-electrode active material composition was molded under the same conditions as in example 1.

The positive-electrode active material composition was discharged from the roll press while excess electrolytic solution was separated, the discharged positive-electrode active material layer firmly held together in the sense that the form was not compromised even if the layer was placed on a glass plate and moved, and the layer had a uniform thickness of 350 μm and a smooth surface. The weight of the electrolytic solution, which was based on the total amount of voids in the positive-electrode active material layer determined from the apparent volume of the positive-electrode active material layer and the sum of the products of the weights and true densities of the solid raw materials constituting the positive-electrode active material layer, was 0.44 g/mL.

Molding of Negative-Electrode Active Material Layer

A negative-electrode active material composition, in which the weight ratio of the electrolytic solution based on the total weight of the electrode active material composition was 20 wt %, was created in the same manner as in example 1, except that the negative-electrode active material particles were changed to 80 parts and the amount electrolytic solution created in manufacturing example 2 was changed to 20 parts.

When the obtained negative-electrode active material composition was pressed with a finger, some of the negative-electrode active material particles contained in the negative-electrode active material composition became an integrated whole by bonding in the form of an aggregated mass, and were able to be separated with little force. The obtained negative-electrode active material composition was molded in a roll press in the same manner as example 1, and a negative-electrode active material composition was molded.

The negative-electrode active material composition was discharged from the roll press while excess electrolytic solution was separated, the discharged negative-electrode active material layer firmly held together in the sense that the form was not compromised even if the layer was placed on a glass plate and moved, and the layer had a uniform thickness of 350 μm and a smooth surface. The weight of the electrolytic solution, which was based on the total amount of voids in the negative-electrode active material layer determined from the apparent volume of the negative-electrode active material layer and the sum of the products of the weights and true densities of the solid raw materials constituting the negative-electrode active material layer, was 0.42 g/mL.

Creation of Lithium-Ion Battery

Copper foil, a positive-electrode active material layer, a separator, a negative-electrode active material layer, and carbon-coated aluminum foil were layered in the same manner as in example 1, 2 parts of the electrolytic solution was poured in, the layered components were then sealed to an aluminum laminate film, and a lithium-ion battery was created. During the layering, the positive-electrode active material layer and the negative-electrode active material layer could be handled without breaking, cracking, etc., due to gravity.

Charging/Discharging Test

As a result of conducting a charging/discharging test in the same manner as example 1, the tenth-cycle capacity maintenance ratio was 98%, and the battery functioned without problems.

Example 4

Molding of Positive-Electrode Active Material Layer

A positive-electrode active material composition, in which the weight ratio of the electrolytic solution based on the total weight of the electrode active material composition was 0.1 wt %, was created in the same manner as in example 1, except that the amount positive-electrode active material particles was changed to 99.9 parts and the amount electrolytic solution created in manufacturing example 2 was changed to 0.1 parts.

When the obtained positive-electrode active material composition was pressed with a finger, some of the positive-electrode active material particles contained in the positive-electrode active material composition became an integrated whole by bonding in the form of an aggregated mass, and were able to be separated with little force. The obtained positive-electrode active material composition was charged into a powder-charging port set into the roll press, and the positive-electrode active material composition was molded under the same conditions as in example 1.

The positive-electrode active material composition was discharged from the roll press while excess electrolytic solution was separated, the discharged positive-electrode active material layer firmly held together in the sense that the form was not compromised even if the layer was placed on a glass plate and moved, and the layer had a uniform thickness of 350 μm and a smooth surface. The weight of the electrolytic solution, which was based on the total amount of voids in the positive-electrode active material layer determined from the apparent volume of the positive-electrode active material layer and the sum of the products of the weights and true densities of the solid raw materials constituting the positive-electrode active material layer, was 0.02 g/mL.

Molding of Negative-Electrode Active Material Layer

A negative-electrode active material composition, in which the weight ratio of the electrolytic solution based on the total weight of the electrode active material composition was 0.1 wt %, was created in the same manner as in example 1, except that the negative-electrode active material particles were changed to 99.9 parts and the amount electrolytic solution created in manufacturing example 2 was changed to 0.1 parts.

When the obtained negative-electrode active material composition was pressed with a finger, some of the negative-electrode active material particles contained in the negative-electrode active material composition became an integrated whole by bonding in the form of an aggregated mass, and were able to be separated with little force. The obtained negative-electrode active material composition was molded in a roll press in the same manner as example 1, and a negative-electrode active material composition was molded.

The negative-electrode active material composition was discharged from the roll press while excess electrolytic solution was separated, the discharged negative-electrode active material layer firmly held together in the sense that the form was not compromised even if the layer was placed on a glass plate and moved, and the layer had a uniform thickness of 350 μm and a smooth surface. The weight of the electrolytic solution, which was based on the total amount of voids in the negative-electrode active material layer determined from the apparent volume of the negative-electrode active material layer and the sum of the products of the weights and true densities of the solid raw materials constituting the negative-electrode active material layer, was 0.01 g/mL.

Creation of Lithium-Ion Battery

Copper foil, a positive-electrode active material layer, a separator, a negative-electrode active material layer, and carbon-coated aluminum foil were layered in the same manner as in example 1, 7 parts of the electrolytic solution was poured in, the layered components were then sealed to an aluminum laminate film, and a lithium-ion battery was created. During the layering, the positive-electrode active material layer and the negative-electrode active material layer could be handled without breaking, cracking, etc., due to gravity.

Charging/Discharging Test

As a result of conducting a charging/discharging test in the same manner as example 1, the tenth-cycle capacity maintenance ratio was 91%, and the battery functioned without problems.

Example 5

Molding of Positive-Electrode Active Material Layer

Using an all-purpose, high-speed mixer FS25 (EarthTechnica), 20 parts of carbon fiber (Donacarbo Milled S-2243 (Osaka Gas Chem)), 100 parts of a solution in which the concentration of the pressure sensitive adhesive resin solution obtained in manufacturing example 1 was adjusted to 1 wt %, 57 parts of acetylene black (Denka Black (Denka)), and 875 parts of $LiNi_{0.8}Co_{0.15}Al_{0.05}O_2$ (HED NCA-7050 (BASF Toda Battery Materials), having a volume-average particle diameter of 10 μm) were stirred for fifteen minutes at room temperature and at 720 rpm. Pressure was reduced to 0.01 MPa while stirring was maintained, temperature was raised to 80° C. while stirring and reduced pressure were maintained, and then stirring, reduced pressure, and temperature were maintained for eight hours to distill off volatile components. The obtained mixture was pulverized to create particles in a Hammer Crusher NH-34S (Sansho Industry) fitted with a 300 μm metal mesh, and positive-electrode active material particles were obtained. In the obtained positive-electrode active material particles, the weight ratio of the pressure sensitive adhesive resin relative to the total weight of the positive-electrode active material particles was 0.10 wt %. 98.2 parts of the obtained positive-electrode active material particles and 1.8 parts of the electrolytic solution created in manufacturing example 2 were charged into a planetary-stirring-type mixing kneader (Awatori Rentaro "Thinky") and mixed for five minutes at 2000 rpm to create a positive-electrode active material composition in which the weight ratio of the electrolytic solution based on the total weight of the electrode active material composition was 1.8 wt %. When the obtained positive-electrode active material composition was pressed with a finger, some of the positive-electrode active material particles contained in the positive-electrode active material composition became an integrated whole by bonding in the form of an aggregated mass, and were able to be separated with little force.

The obtained positive-electrode active material composition was charged into a powder-charging port set into the roll press, and the positive-electrode active material composition was molded under the following conditions.

The positive-electrode active material layer discharged from the roll press firmly held together in the sense that the form was not compromised even if the layer was placed on a glass plate and moved, and the layer had a uniform thickness of 350 μm and a smooth surface. The weight of the electrolytic solution, which was based on the amount of voids in the positive-electrode active material layer determined from the apparent volume of the positive-electrode active material layer and the sum of the products of the weights and true densities of the solid raw materials constituting the positive-electrode active material layer, was 0.26 g/mL.

The thickness of the positive-electrode active material layer was measured by using a micrometer.

Roll Press Conditions
  Roll size: 250 mmϕ×400 mm
  Roll rotation speed: 1 m/min
  Gap between rolls: 350 μm
  Pressure: 10 kN (line pressure: 25 kN/m)

Molding of Negative-Electrode Active Material Layer

Using an all-purpose, high-speed mixer FS25 (EarthTechnica), 20 parts of carbon fiber (Donacarbo Milled S-2243 (Osaka Gas Chem)), 55 parts of a solution in which the concentration of the pressure sensitive adhesive resin solution obtained in manufacturing example 1 was adjusted to 1 wt %, 57 parts of acetylene black (Denka Black (Denka)), and 430 parts of negative-electrode material carbon for a lithium-ion battery (CARBOTRON P (Kureha Battery Materials Japan), particle diameter: 20 μm) were stirred for fifteen minutes at room temperature and at 720 rpm. Pressure was reduced to 0.01 MPa while stirring was maintained, temperature was raised to 80° C. while stirring and reduced pressure were maintained, and then stirring, reduced pressure, and temperature were maintained for eight hours to distill off volatile components. The obtained mixture was pulverized to create particles in a Hammer Crusher NH-34S (Sansho Industry) fitted with a 300 μm metal mesh, and negative-electrode active material particles were obtained. In the obtained negative-electrode active material particles, the weight ratio of the pressure sensitive adhesive resin relative to the total weight of the negative-electrode active material particles was 0.11 wt %. 98.2 parts of the obtained negative-electrode active material particles and 1.8 parts of the electrolytic solution created in manufacturing example 2 were charged into a planetary-stirring-type mixing kneader (Awatori Rentaro "Thinky") and mixed for five minutes at 2000 rpm to create a negative-electrode active material composition in which the weight ratio of the electrolytic solution based on the total weight of the negative-electrode active material composition was 1.8 wt %.

When the obtained negative-electrode active material composition was pressed with a finger, some of the negative-electrode active material particles contained in the negative-electrode active material composition became an integrated whole by bonding in the form of an aggregated mass, and were able to be separated with little force.

The obtained negative-electrode active material composition was molded in a roll press in the same manner as in "Molding of positive-electrode active material layer" described above, and the negative-electrode active material composition was molded. The negative-electrode active material layer discharged from the roll press firmly held together in the sense that the form was not compromised even if the layer was placed on a glass plate and moved, and the layer had a uniform thickness of 350 μm and a smooth surface. The weight of the electrolytic solution, which was based on the amount of voids in the negative-electrode active material layer determined from the apparent volume of the negative-electrode active material layer and the sum of the products of the weights and true densities of the solid raw materials constituting the negative-electrode active material layer, was 0.21 g/mL.

Creation of Lithium-Ion Battery

The positive-electrode active material layer (size: 18 cm×9 cm×350 μm) obtained as described above was placed on carbon-coated aluminum foil fitted with a terminal for current extraction, a separator (Celguard 3501, thickness 25 μm) was placed thereon, the negative-electrode active material layer (size: 18.2 cm×9.2 cm×350 μm) obtained as described above was also placed thereon, copper foil fitted with a terminal for current extraction was placed thereon, the terminals for current extraction on the positive-electrode size and negative-electrode side were oriented to protrude in the same direction and sandwiched between two commercial heat-welding aluminum laminated films (25 cm×13.2 cm), and the protruding edge of each terminal was heat-welded. During these placements, the positive-electrode active material layer and the negative-electrode active material layer could be handled without breaking, cracking, etc., due to gravity.

The laminate cell was then closed so that the aluminum foil in the laminate cell was covered, and two edges orthogonal to the prior heat-welded edge were heat-sealed.

5 parts of the electrolytic solution created in manufacturing example 2 was poured in from the remaining edge and the remaining edge was heat-sealed while a vacuum was created in the cell interior using a vacuum sealer, whereby the laminate cell was sealed and a lithium-ion battery was created.

Charging/Discharging Test

As a result of conducting a charging/discharging test in the same manner as example 1, the tenth-cycle capacity maintenance ratio was 98%, and the battery functioned without problems.

Example 6

Molding of Positive-Electrode Active Material Layer

Using an all-purpose, high-speed mixer FS25 (EarthTechnica), 20 parts of carbon fiber (Donacarbo Milled S-2243 (Osaka Gas Chem)), 600 parts of a solution in which the concentration of the pressure sensitive adhesive resin solution obtained in manufacturing example 1 was adjusted to 20 wt %, 57 parts of acetylene black (Denka Black (Denka)), and 875 parts of $LiNi_{0.8}Co_{0.15}Al_{0.05}O_2$ (HED NCA-7050 (BASF Toda Battery Materials), having a volume-average particle diameter of 10 μm) were stirred for fifteen minutes at room temperature and at 720 rpm. Pressure was reduced to 0.01 MPa while stirring was maintained, temperature was raised to 80° C. while stirring and reduced pressure were maintained, and then stirring, reduced pressure, and temperature were maintained for eight hours to distill off volatile components. The obtained mixture was pulverized to create particles in a Hammer Crusher NH-34S (Sansho Industry) fitted with a 300 μm metal mesh, and positive-electrode active material particles were obtained. In the obtained positive-electrode active material particles, the weight ratio of the pressure sensitive adhesive resin relative to the total weight of the positive-electrode active material particles was 11.19 wt %. 98.2 parts of the obtained positive-electrode active material particles and 1.8 parts of the electrolytic solution created in manufacturing example 2 were charged into a planetary-stirring-type mixing kneader (Awatori Rentaro "Thinky") and mixed for five minutes at 2000 rpm to create a positive-electrode active material composition in which the weight ratio of the electrolytic solution based on the total weight of the electrode active material composition was 1.8 wt %. When the obtained positive-electrode active material composition was pressed with a finger, some of the positive-electrode active material particles contained in the positive-electrode active material composition became an integrated whole by bonding in the form of an aggregated mass, and were able to be separated with little force.

The obtained positive-electrode active material composition was charged into a powder-charging port set into the roll press, and the positive-electrode active material composition was molded under the following conditions.

The positive-electrode active material layer discharged from the roll press firmly held together in the sense that the form was not compromised even if the layer was placed on a glass plate and moved, and the layer had a uniform thickness of 350 μm and a smooth surface. The weight of the electrolytic solution, which was based on the amount of voids in the positive-electrode active material layer determined from the apparent volume of the positive-electrode active material layer and the sum of the products of the weights and true densities of the solid raw materials constituting the positive-electrode active material layer, was 0.26 g/mL.

The thickness of the positive-electrode active material layer was measured by using a micrometer.

Molding of Negative-Electrode Active Material Layer

A negative-electrode active material composition in which the weight ratio of the electrolytic solution based on the total weight of the electrode active material composition was 1.8 wt % was created in the same manner as in example 5.

When the obtained negative-electrode active material composition was pressed with a finger, some of the negative-electrode active material particles contained in the negative-electrode active material composition became an integrated whole by bonding in the form of an aggregated mass, and were able to be separated with little force.

The obtained negative-electrode active material composition was molded in a roll press in the same manner as in "Molding of positive-electrode active material layer" described above, and the negative-electrode active material composition was molded. The negative-electrode active material layer discharged from the roll press firmly held together in the sense that the form was not compromised even if the layer was placed on a glass plate and moved, and the layer had a uniform thickness of 350 μm and a smooth surface. The weight of the electrolytic solution, which was based on the amount of voids in the negative-electrode active material layer determined from the apparent volume of the negative-electrode active material layer and the sum of the products of the weights and true densities of the solid raw materials constituting the negative-electrode active material layer, was 0.21 g/mL.

Creation of Lithium-Ion Battery

The positive-electrode active material layer (size: 18 cm×9 cm×350 μm) obtained as described above was placed on carbon-coated aluminum foil fitted with a terminal for current extraction, a separator (Celguard 3501, thickness 25 μm) was placed thereon, the negative-electrode active material layer (size: 18.2 cm×9.2 cm×350 μm) obtained as described above was also placed thereon, copper foil fitted with a terminal for current extraction was placed thereon, the terminals for current extraction on the positive-electrode size and negative-electrode side were oriented to protrude in the same direction and sandwiched between two commercial heat-welding aluminum laminated films (25 cm×13.2 cm), and the protruding edge of each terminal was heat-welded. During these placements, the positive-electrode active material layer and the negative-electrode active material layer could be handled without breaking, cracking, etc., due to gravity.

The laminate cell was then closed so that the aluminum foil in the laminate cell was covered, and two edges orthogonal to the prior heat-welded edge were heat-sealed.

5 parts of the electrolytic solution created in manufacturing example 2 was poured in from the remaining edge and the remaining edge was heat-sealed while a vacuum was created in the cell interior using a vacuum sealer, whereby the laminate cell was sealed and a lithium-ion battery was created.

Charging/Discharging Test

As a result of conducting a charging/discharging test in the same manner as example 1, the tenth-cycle capacity maintenance ratio was 73%, and the battery functioned without problems.

Comparative Example 1

Molding of Negative-Electrode Active Material Layer for Comparison 100 parts of negative-electrode material carbon for a lithium-ion battery, 5 parts of acetylene black, 1.5 parts of carboxymethyl cellulose sodium salt, and 10 parts of diene-based polymer latex (glass transition temperature: −19° C.) as a solid content equivalent were charged into all-purpose, high-speed mixer FS25 and stirred at 720 rpm at room temperature, then ion-exchanged water was added so that the solid content concentration reached 20%, and the mixture was stirred for an additional five minutes. Pressure was then reduced to 0.01 MPa while stirring was maintained, temperature was raised to 140° C. while stirring and reduced pressure were maintained, and then stirring, reduced pressure, and temperature were maintained for eight hours to distill off volatile components and obtain a negative-electrode active material composition for comparison.

Even when the obtained negative-electrode active material composition for comparison was pressed with a finger, there was no incidence of some or all of the negative-electrode active material particles contained in the negative-electrode active material composition comparison becoming an integrated whole, and the particles did not exhibit pressure sensitive adhesiveness.

The obtained negative-electrode active material composition for comparison was molded in a roll press in the same manner as in example 1 without being mixed with an electrolytic solution, thus a negative-electrode active material composition was molded. A negative-electrode active material layer discharged from the roll press was brittle and broke readily, the thickness was not uniform, the thinnest portion was 580 μm, and the surface was not smooth. The weight of the electrolytic solution, which was based on the total amount of voids in the negative-electrode active material layer for comparison determined from the apparent volume of the negative-electrode active material layer for comparison and the sum of the products of the weights and true densities of the solid raw materials constituting the negative-electrode active material layer for comparison, was 0 g/mL.

Creation of Lithium-Ion Battery for Comparison

Layering of a copper foil, a positive-electrode active material layer, a separator, a negative-electrode active material layer, and a carbon-coated aluminum foil and sealing of the layers to an aluminum laminate film were performed in the same manner as in example 1, except that the negative-electrode active material layer for comparison created as described above was used as the negative-electrode active material layer, and an electrolytic solution was poured in to create a lithium-ion battery for comparison.

Charging/Discharging Test

As a result of conducting a charging/discharging test in the same manner as in example 1, the lithium-ion battery for comparison had a tenth-cycle capacity maintenance ratio of 61% and did not exhibit sufficient performance as a lithium-ion battery. This is surmised to be because only an electrode having great film thickness could be molded in the negative electrode, internal resistance was high, and rate characteristics were poor.

Comparative Example 2

100 parts of $LiNi_{0.8}Co_{0.15}Al_{0.05}O_2$ (HED NCA-7050 (BASF Toda Battery Materials), having a volume-average particle diameter of 10 μm), 5 parts of acetylene black, 1.5 parts of carboxymethyl cellulose sodium salt, and 10 parts of diene-based polymer latex (glass transition temperature: −19° C.) as a solid content equivalent were charged into all-purpose, high-speed mixer FS25 and stirred at 720 rpm at room temperature, then ion-exchanged water was added so that the solid content concentration reached 20%, and the mixture was stirred for an additional five minutes. Pressure was then reduced to 0.01 MPa while stirring was maintained, temperature was raised to 140° C. while stirring and reduced pressure were maintained, and then stirring, reduced pressure, and temperature were maintained for eight hours to distill off volatile components and obtain a positive-electrode active material composition for comparison.

Even when the obtained positive-electrode active material composition for comparison was pressed with a finger, there was no incidence of some nor all of the positive-electrode active material particles contained in the positive-electrode active material composition comparison becoming an integrated whole, and the particles did not exhibit pressure sensitive adhesiveness.

The obtained positive-electrode active material composition for comparison was molded in a roll press in the same manner as in example 1 without being mixed with an electrolytic solution, thus a positive-electrode active material composition was molded. A positive-electrode active material layer discharged from the roll press was brittle and broke readily, the thickness was not uniform, the thinnest portion was 580 μm, and the surface was not smooth. The weight of the electrolytic solution, which was based on the total amount of voids in the positive-electrode active material layer for comparison determined from the apparent volume of the positive-electrode active material layer for comparison and the sum of the products of the weights and true densities of the solid raw materials constituting the positive-electrode active material layer for comparison, was 0 g/mL.

Creation of Lithium-Ion Battery for Comparison

Layering of a copper foil, a positive-electrode active material layer, a separator, a negative-electrode active material layer, and a carbon-coated aluminum foil and sealing of the layers to an aluminum laminate film were performed in the same manner as in example 1, except that the positive-electrode active material layer for comparison created as described above was used as the positive-electrode active material layer, and an electrolytic solution was poured in to create a lithium-ion battery for comparison.

Charging/Discharging Test

As a result of conducting a charging/discharging test in the same manner as in example 1, the lithium-ion battery for comparison had a tenth-cycle capacity maintenance ratio of 54% and did not exhibit sufficient performance as a lithium-ion battery. This is surmised to be because only an electrode having great film thickness could be molded in the positive electrode, internal resistance was high, and rate characteristics were poor.

Comparative Example 3

Creation of Lithium-Ion Battery

Layering of a copper foil, a positive-electrode active material layer, a separator, a negative-electrode active material layer, and a carbon-coated aluminum foil and sealing of the layers to an aluminum laminate film were performed in the same manner as in example 1, except that the positive-electrode active material layer for comparison created in comparative example 2 was used as the positive-electrode active material layer and the negative-electrode active material layer for comparison created in comparative example 1 was used as the negative-electrode active material layer, and an electrolytic solution was poured in to create a lithium-ion battery for comparison.

Charging/Discharging Test

As a result of conducting a charging/discharging test in the same manner as in example 1, the lithium-ion battery for comparison had a tenth-cycle capacity maintenance ratio of 34% and did not exhibit sufficient performance as a lithium-ion battery. This is surmised to be because only an electrode having great film thickness could be molded in both the positive electrode and the negative electrode, internal resistance was high, and rate characteristics were poor.

In the method for manufacturing a lithium-ion battery of the present invention, drying and heating steps were not needed when forming the electrode active material layers constituting the positive electrode and the negative electrode, thin and easily handled electrode active material layers could be obtained through simpler steps that in a method for manufacturing a lithium-ion battery through a drying method not using water or a solvent (comparative example), and as a result, it was confirmed that a lithium-ion battery having exceptional cycle durability was obtained.

The method for manufacturing a lithium-ion battery of the present invention is particularly useful as a method for manufacturing bipolar secondary batteries, lithium ion secondary batteries, etc., used in portable phones, personal computers, hybrid automotive vehicles, and electric automotive vehicles.

The invention claimed is:

1. A method for manufacturing an electrode for a lithium-ion battery having a current collector and an electrode active material layer, the method comprising:
   forming the electrode by molding an electrode active material composition containing electrode active material particles and an electrolytic solution into sheet form using a roll press such that opposite surfaces of the electrode active material composition are each in contact with rolls of the roll press, discharging the electrode active material composition in sheet form vertically or horizontally away from the rolls and layering the electrode active material composition formed into sheet form onto a surface of the current collector after the electrode active material composition has been discharged from the rolls to form the electrode active material layer,
   a weight of the electrolytic solution based on a total weight of the electrode active material composition being 0.1-50 wt %, and
   the method not including a step of drying or heating when forming the electrode active material layer.

TABLE 1

| | | Active Material Composition | | | | Electroytic Solution | Evaluation Tenth-Cycle |
|---|---|---|---|---|---|---|---|
| | | Electrode Active Material Particles (Wt %) | Electrolytic Solution (Wt %) | Pressure Sensitive Adhesive Resin (Wt %) In Electrode Active Material Particles | Pressure Sensitive Adhesiveness | Weight (G/MI) Based On Total Void Amount In Electrode Active Material Layer | Capacity Maintenance Ratio (%) |
| Example 1 | Positive Electrode | 98.2 | 1.8 | 3.06 | Yes | 0.26 | 97 |
| | Negative Electrode | 98.2 | 1.8 | 5.59 | Yes | 0.21 | |
| Example 2 | Positive Electrode | 50 | 50 | 3.06 | Yes | 0.47 | 94 |
| | Negative Electrode | 50 | 50 | 5.59 | Yes | 0.45 | |
| Example 3 | Positive Electrode | 80 | 20 | 3.06 | Yes | 0.44 | 98 |
| | Negative Electrode | 80 | 20 | 5.59 | Yes | 0.42 | |
| Example 4 | Positive Electrode | 99.9 | 0.1 | 3.06 | Yes | 0.02 | 91 |
| | Negative Electrode | 99.9 | 0.1 | 5.59 | Yes | 0.01 | |
| Example 6 | Positive Electrode | 98.2 | 1.8 | 0.10 | Yes | 0.26 | 98 |
| | Negative Electrode | 98.2 | 1.8 | 0.11 | Yes | 0.21 | |
| Example 6 | Positive Electrode | 98.2 | 1.8 | 11.19 | Yes | 0.26 | 73 |
| | Negative Electrode | 98.2 | 1.8 | 0.11 | Yes | 0.21 | |
| Comp. Example 1 | Positive Electrode | 98.2 | 1.8 | 3.06 | Yes | 0.26 | 61 |
| | Negative Electrode | 100 | 0 | 0 | No | 0 | |
| Comp. Example 2 | Positive Electrode | 100 | 0 | 0 | Yes | 0 | 54 |
| | Negative Electrode | 98.2 | 1.8 | 5.59 | Yes | 0.21 | |
| Comp. Example 3 | Positive Electrode | 100 | 0 | 0 | Yes | 0 | 34 |
| | Negative Electrode | 100 | 0 | 0 | Yes | 0 | |

2. The method according to claim 1, wherein;
   the electrode active material composition includes a pressure sensitive adhesive resin, and
   a weight ratio of the pressure sensitive adhesive resin relative to a total weight of the electrode active material particles is 0.1-6 wt %.

3. The method according to claim 1, wherein
   an electrode binder content of the electrode active material composition is 1 wt % or less.

4. The method according to claim 1, wherein
   the electrolytic solution does not contain acetone.

5. The method according to claim 1, wherein
   the method does not include a step of removing, by volatilization, a solvent contained in the electrolytic solution.

6. The method according to claim 1, wherein;
the electrode active material composition includes a pressure sensitive adhesive resin, and
the pressure sensitive adhesive resin does not contain a polymer of vinylidene fluoride.

7. The method according to claim 1, wherein
the electrode active material composition does not contain an electrode binder.

8. The method according to claim 1, wherein
the rolls of the roll press are rotated at a same speed.

9. A method for manufacturing an electrode for a lithium-ion battery having a current collector and an electrode active material layer, the method comprising:
forming the electrode by molding an electrode active material composition containing electrode active material particles and an electrolytic solution into sheet form using a roll press such that opposite surfaces of the electrode active material composition are each in contact with rolls of the roll press, discharging the electrode active material composition in sheet form vertically or horizontally away from the rolls and layering the electrode active material composition formed into sheet form onto a surface of the current collector after the electrode active material composition has been discharged from the rolls to form the electrode active material layer,
a weight of the electrolytic solution based on a total weight of the electrode active material composition being 0.1-50 wt %,
the electrode active material composition not containing an electrode binder.

10. A method for manufacturing an electrode for a lithium-ion battery having a current collector and an electrode active material layer, the method comprising:
forming the electrode by molding an electrode active material composition containing electrode active material particles and an electrolytic solution into sheet form using a roll press such that opposite surfaces of the electrode active material composition are each in contact with rolls of the roll press, discharging the electrode active material composition in sheet form vertically or horizontally away from the rolls and layering the electrode active material composition formed into sheet form onto a surface of the current collector after the electrode active material composition has been discharged from the rolls to form the electrode active material layer,
a weight of the electrolytic solute on based on a total weight of the electrode active material composition being 0.1-50 wt %, and
the electrode active material composition including a pressure sensitive adhesive resin, a weight ratio of the pressure sensitive adhesive resin relative to a total weight of the electrode active material particles being 0.1-6 wt %.

* * * * *